United States Patent
Burd (10) Patent No.: US 12,071,912 B2
(45) Date of Patent: Aug. 27, 2024

(54) TURBOSHAFT ENGINE

(71) Applicant: RAYTHEON TECHNOLOGIES CORPORATION, Farmington, CT (US)

(72) Inventor: Steven W. Burd, Cheshire, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/734,324

(22) Filed: May 2, 2022

(65) Prior Publication Data

US 2022/0389883 A1 Dec. 8, 2022

Related U.S. Application Data (60) Provisional application No. 63/197,072, filed on Jun. 4, 2021.

(51) Int. Cl.

| | |
|---|---|
| *F02K 3/02* | (2006.01) |
| *F02C 3/04* | (2006.01) |
| *F02C 7/36* | (2006.01) |
| *F02C 9/18* | (2006.01) |

(52) U.S. Cl.
CPC .............. *F02K 3/02* (2013.01); *F02C 3/04* (2013.01); *F02C 7/36* (2013.01); *F02C 9/18* (2013.01); *F05D 2220/32* (2013.01); *F05D 2240/35* (2013.01); *F05D 2260/606* (2013.01)

(58) Field of Classification Search
CPC ..... F02K 3/02; F02K 3/04; F02K 3/06; F02K 3/105; F02K 3/11; F02C 3/04; F02C 7/36; F02C 9/18; F05D 2220/32; F05D 2240/35; F05D 2260/606
See application file for complete search history.

(56) References Cited

U.S. PATENT DOCUMENTS

| | | | | |
|---|---|---|---|---|
| 4,137,708 | A * | 2/1979 | Aspinwall | F02K 3/11 60/204 |
| 4,791,783 | A | 12/1988 | Neitzel | |
| 10,563,593 | B2 | 2/2020 | McNeil et al. | |
| 2011/0171007 | A1* | 7/2011 | Johnson | F02C 9/18 415/145 |
| 2013/0019585 | A1* | 1/2013 | Merry | F02K 3/068 60/226.3 |
| 2016/0169029 | A1* | 6/2016 | Schwarz | F02C 9/18 60/797 |
| 2017/0058831 | A1 | 3/2017 | Bryan et al. | |
| 2019/0017437 | A1* | 1/2019 | Tangirala | F23R 7/00 |
| 2020/0017229 | A1 | 1/2020 | Steinert et al. | |

\* cited by examiner

*Primary Examiner* — Steven M Sutherland
(74) *Attorney, Agent, or Firm* — SNELL & WILMER L.L.P.

(57) ABSTRACT

A turboshaft engine includes a core engine, including a fan section, a compressor section, a primary combustor and a turbine section positioned within a core flow path of the gas turbine engine; a bypass splitter positioned radially outward of the core engine and configured to house the compressor section, the primary combustor and the turbine section; a bypass duct positioned radially outward of the bypass splitter; and a power spool operably coupled to the core engine and configured rotationally drive a fan included within the fan section.

2 Claims, 7 Drawing Sheets

TURBOSHAFT ENGINE

CROSS-REFERENCE TO RELATED APPLICATIONS

This application is based upon and claims priority to U.S. provisional patent application 63/197,072 entitled "TURBOSHAFT ENGINE" and filed on Jun. 4, 2021, the entire content of which is incorporated herein by reference

FIELD

The present disclosure relates generally to gas turbine engines and, more particularly, to turboshaft gas turbine engines having fans, bypass ducts and supplemental combustors.

BACKGROUND

Gas turbine engines of the turbofan type typically include a fan section, a compressor section, a combustor section and a turbine section. The fan section drives air along a bypass flow path while the compressor section drives air along a core flow path. In general, during operation, air is pressurized in the compressor section and is mixed with fuel and burned in the combustor section to generate hot combustion gases. Efficient and thorough mixing and combustion of the fuel and air is often facilitated using swirlers disposed upstream of a combustion zone where burning of the fuel and air occurs. Subsequent to combustion, the hot combustion gases flow through the turbine section, which extracts energy from the hot combustion gases to power the compressor section and other gas turbine engine loads, such as those required to rotate fan blades in the fan section. The compressor section typically includes low-pressure and high-pressure compressors, and the turbine section includes low-pressure and high-pressure turbines.

Gas turbine engines of the turboshaft type, typical for use in rotorcraft applications, differ from turbofan engines in design and mission requirements. For example, while turbofan engines are configured to power a fan which pushes bypass flow for high propulsive efficiency and thrust, turboshaft engines are focused primarily on providing mechanical shaft power (e.g., shaft power to turn a helicopter rotor). Rotorcraft applications will benefit from engines that are configured to not only provide mechanical shaft power, but also power for forward thrust similar to that produced by a turbofan engine. Further, these applications will benefit by being configured to satisfy maximum shaft power and forward thrust performance metrics with minimum consumption of fuel.

SUMMARY

A gas turbine engine is disclosed. In various embodiments, the gas turbine engine includes a core engine, including a compressor section, a primary combustor and a turbine section positioned within a core flow path of the gas turbine engine; a bypass splitter positioned radially outward of the core engine and configured to house the compressor section, the primary combustor and the turbine section; a bypass duct positioned radially outward of the bypass splitter; and a power spool operably coupled to the core engine. In various embodiments, gas turbine engine includes a fan section and the power spool is operably connected to a fan within the fan section and configured to rotationally drive the fan.

In various embodiments, the gas turbine engine includes a high-speed spool, the compressor section includes a high-pressure compressor and the turbine section includes a high-pressure turbine, the high-pressure compressor and the high-pressure turbine being interconnected via the high-speed spool. In various embodiments, the gas turbine engine includes a low-speed spool and the compressor section includes a low-pressure compressor and the turbine section includes a low-pressure turbine, the low-pressure compressor and the low-pressure turbine being interconnected via the low-speed spool. In various embodiments, the power spool includes a power turbine positioned downstream of the low-pressure turbine. In various embodiments, the power spool includes a power shaft configured to interconnect a fan gearbox to the power turbine, the fan gearbox operably connected to the fan.

In various embodiments, the gas turbine engine includes a supplemental combustor. In various embodiments, the supplemental combustor is a rotating detonation combustor that includes a fuel-air mixer configured to receive a compressed air and a fuel. In various embodiments, the rotating detonation combustor includes an annular structure positioned downstream of the fuel-air mixer and configured to combust the compressed air and the fuel. In various embodiments, the compressed air is provided to the rotating detonation combustor via the bypass duct. In various embodiments, the rotating detonation combustor is positioned within the bypass duct. In various embodiments, the rotating detonation combustor is positioned within an exit nozzle of the gas turbine engine, the exit nozzle positioned downstream of the bypass duct and the rotating detonation combustor is configured to combust the compressed air, the fuel and an exhaust stream exiting the power turbine.

A turboshaft engine for an aircraft is disclosed. In various embodiments, the turboshaft engine includes a core engine, including a fan section, a compressor section, a primary combustor and a turbine section positioned within a core flow path of the turboshaft engine; a bypass splitter positioned radially outward of the core engine and configured to house the compressor section, the primary combustor and the turbine section; a bypass duct positioned radially outward of the bypass splitter; and a power spool operably coupled to the core engine and configured rotationally drive a fan included within the fan section.

In various embodiments, the turboshaft engine includes a main spool and the compressor section includes a compressor and the turbine section includes a primary turbine, the compressor and the primary turbine being interconnected via the main spool. In various embodiments, the power spool includes a power turbine positioned downstream of the primary turbine. In various embodiments, the power spool includes a power shaft configured to interconnect a fan gearbox to the power turbine, the fan gearbox operably connected to the fan.

In various embodiments, the turboshaft engine includes a rotating detonation combustor configured to receive a compressed air and a fuel. In various embodiments, the compressed air is provided to the rotating detonation combustor via the bypass duct. In various embodiments, the rotating detonation combustor is positioned within the bypass duct and configured to combust the compressed air and the fuel. In various embodiments, the rotating detonation combustor is positioned within an exit nozzle of the turboshaft engine, the exit nozzle positioned downstream of the bypass duct and wherein the rotating detonation combustor is configured to combust the compressed air, the fuel and an exhaust stream exiting the power turbine.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
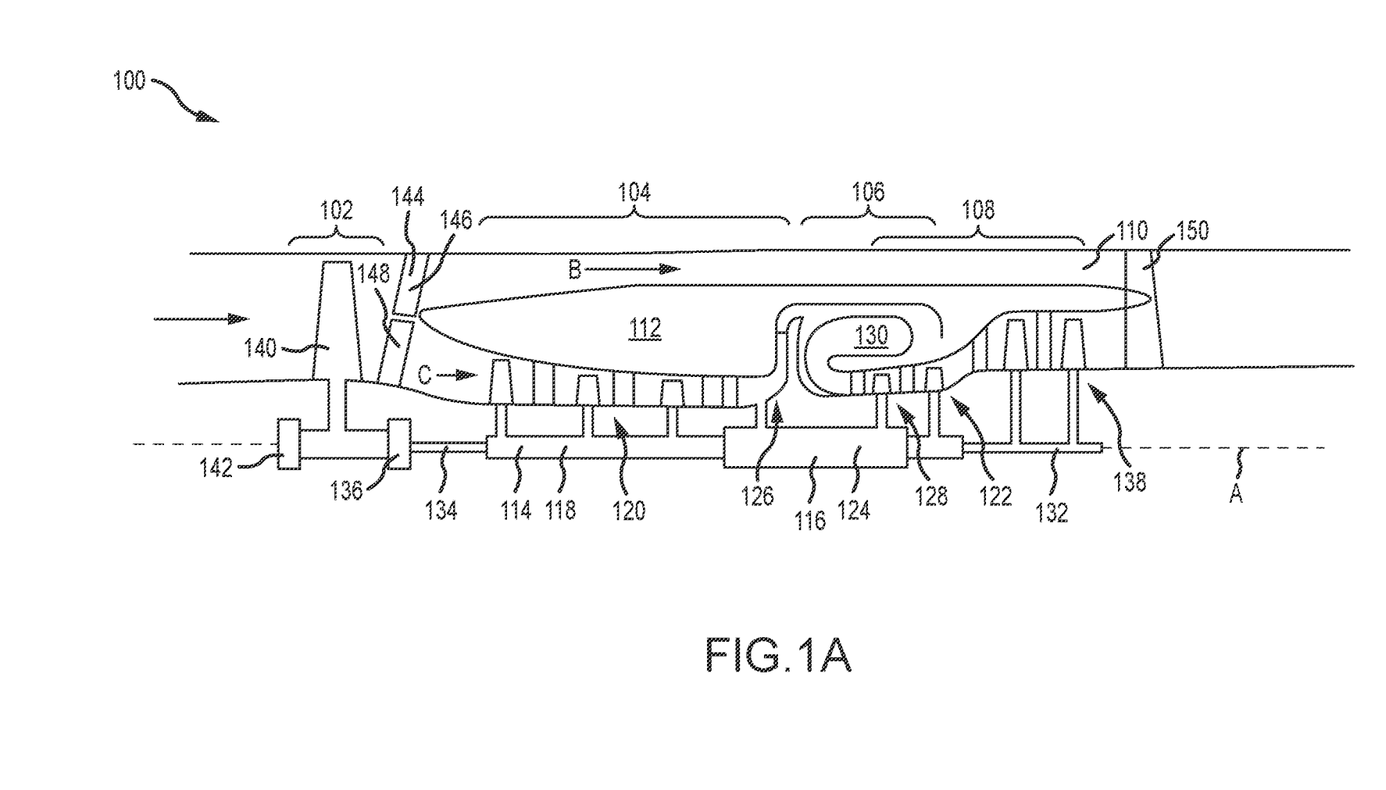
FIGS. 1A, 1B and 1C provide cross-sectional schematic views of a turboshaft engine, in accordance with various embodiments.

Referring now to the drawings, FIG. 1A provides a cross-sectional schematic view of a turboshaft engine 100, in accordance with various embodiments. The turboshaft engine 100 is disclosed herein as a three-spool turboshaft engine that generally incorporates a fan section 102, a compressor section 104, a combustor section 106 and a turbine section 108. The compressor section 104 (and to some extent the fan section 102) drives air along a core flow path C for compression and communication into the combustor section 106 and then expansion through the turbine section 108. The fan section 102 is configured to drive a bypass flow B (typically air) through a bypass duct 110. In general, the bypass duct 110 is defined by an annular space disposed radially outside a bypass splitter 112, which also encloses and provides a housing for the core engine components (e.g., the compressor section 104, the combustor section 106 and the turbine section 108) of the turboshaft engine 100.

The turboshaft engine 100 is depicted as a three-spool configuration, which includes a low-speed spool 114 and a high-speed spool 116 mounted for rotation about an engine central longitudinal axis A. The low-speed spool 114 generally includes an inner shaft 118 that interconnects a low-pressure compressor 120 to a low-pressure turbine 122. The high-speed spool 116 generally includes an outer shaft 124 that interconnects a high-pressure compressor 126 (depicted as a centrifugal compressor) and a high-pressure turbine 128. A combustor 130 is arranged between the high-pressure compressor 126 and the high-pressure turbine 128. The inner shaft 118 and the outer shaft 124 are concentric and rotate about the engine central longitudinal axis A, which is collinear with longitudinal axes of the inner shaft 118 and the outer shaft 124. The air in the core flow path C is compressed by the low-pressure compressor 120 and then the high-pressure compressor 126, mixed and burned with fuel in the combustor 130, and then expanded over the high-pressure turbine 128 and the low-pressure turbine 122. The low-pressure turbine 122 and the high-pressure turbine 128 rotationally drive, respectively, the low-speed spool 114 (and the low-pressure compressor 120) and the high-speed spool 116 (and the high-pressure compressor 126) in response to the expansion.

Still referring to FIG. 1A, the turboshaft engine 100 further includes a third spool, referred to herein as a power spool 132, in addition to the low-speed spool 114 and the high-speed spool 116. The power spool 132 generally includes a power shaft 134 that interconnects a fan gearbox 136 to a power turbine 138. The power shaft 134 is also configured to rotate about the engine central longitudinal axis A and includes a longitudinal axis that is also collinear with the longitudinal axes of the inner shaft 118 and the outer shaft 124. The power spool 132 is driven by hot combustion gases expanding over the power turbine 138 after the gases exit the low-pressure turbine 122. The power turbine 138 rotationally drives the fan gearbox 136 in response to the expansion. The fan gearbox 136 operably connects a fan gear system (e.g., an epicyclic gear system) to a fan 140 within the fan section 102. The fan gearbox 136, in various embodiments, is configured to drive the fan 140 at a different rotational speed than that of the power spool 132 during operation. In various embodiments, the power shaft 134 also interconnects a rotor gearbox 142 to the power turbine 138. The rotor gearbox 142 operably connects a rotor gear system to a rotor (e.g., a main rotor or a tail rotor of a helicopter). The rotor gearbox 142, in various embodiments, is configured to drive the rotor at a different rotational speed than that of the power spool 132 during operation. Note that in various embodiments, one or both of the fan gear box 136 and the rotor gear box 142 may also comprise a clutch or a continuously variable transmission or the like in addition to or as a substitute for more conventional gear assemblies.

During operation, the core engine components drive the power spool 132, as described above, and, in turn, drive the fan 140. As the fan 140 rotates, the bypass flow B (typically air) is driven through the bypass duct 110, providing a thrust component for the rotorcraft application. The thrust component, for example, may be a forward thrust component for a helicopter application, where the engines are typically in a fixed position with respect to the fuselage. In various embodiments, the turboshaft engine 100 includes a variable strut 144 (e.g., a fan exit variable vane) to manage or regulate one or both of the bypass flow B and the core flow C. In various embodiments, for example, the variable strut 144 may comprise separately operated struts, including a bypass flow variable strut 146 and a core flow variable strut 148. Although variable struts are one exemplary embodiment used herein, other forms of flow control devices may be leveraged. An aft engine strut 150 may also be included to manage or regulate the exit or exhaust flows of, respectively, the bypass flow B and the core flow C, and to assist mixing the two flows as they exit the turboshaft engine 100. In addition to driving the fan 140, the power turbine 138, as also described above, drives a rotor or similar device typically used with the rotorcraft application. Accordingly, a benefit of the turboshaft engine 100 is to provide conventional lift and thrust typically associated with, for example, the rotor of a helicopter, while at the same time providing a thrust component typically associated with a high or low bypass gas turbine engine.

Figure 1B:
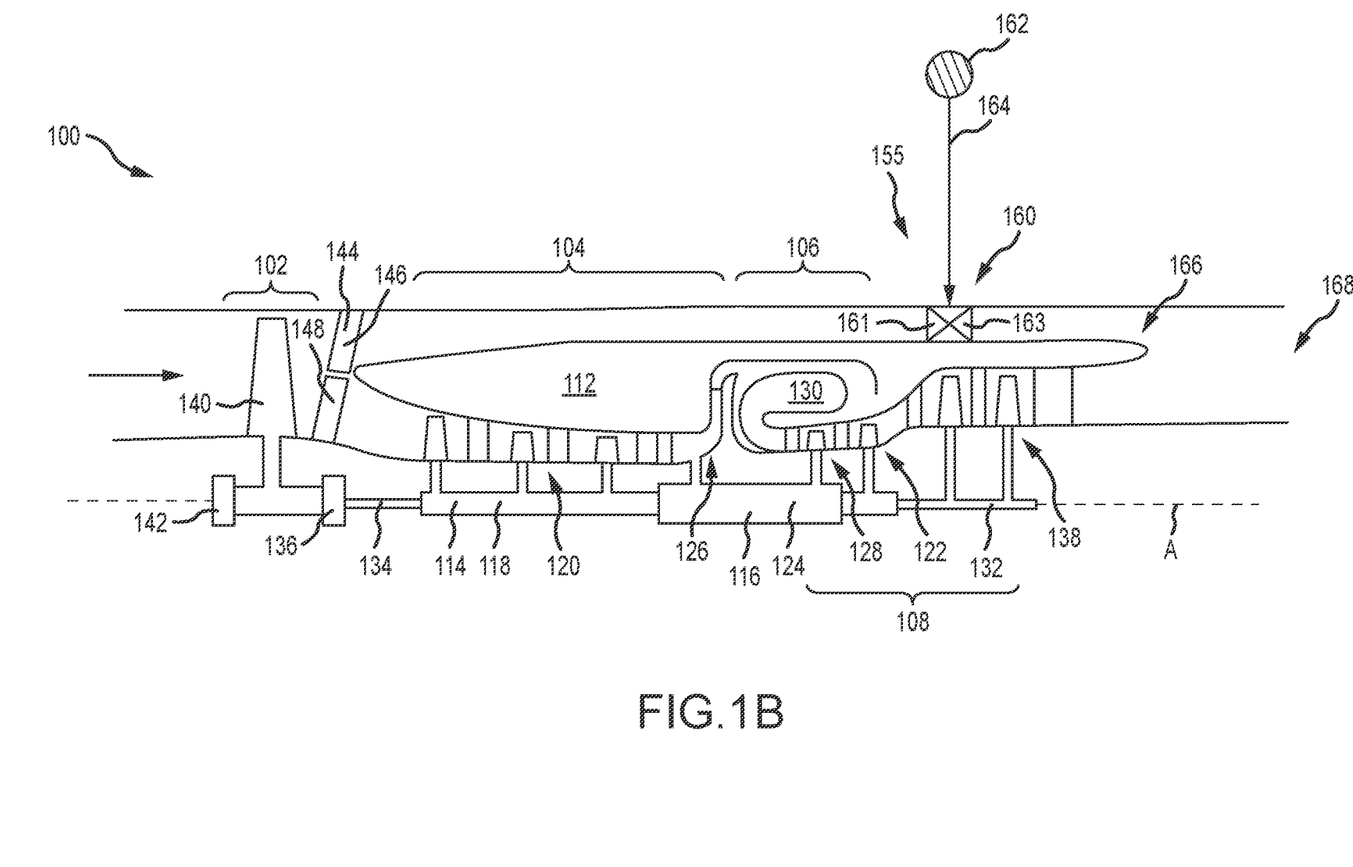

Referring now to FIG. 1B, the turboshaft engine 100 includes a supplemental combustor 155, which, in various embodiments, may take the form of a rotating detonation combustor 160 positioned within the bypass duct 110. As will be described further below (with reference to FIGS. 3A and 3B), in various embodiments, the rotating detonation combustor 160 includes a fuel-air mixer 161 and an annular structure 163 disposed downstream of the fuel-air mixer 161. In various embodiments, compressed air within the bypass duct 110 is delivered to the rotating detonation combustor 160 and fuel from a fuel source 162 is delivered to the rotating detonation combustor 160 via a fuel duct 164. The combustion process begins in the rotating detonation combustor 160 when the fuel-air mixture is ignited via a spark or another suitable ignition source to generate a compression wave. The compression wave is followed by a chemical reaction that transitions the compression wave to a detonation wave. The detonation wave enters a combustion chamber of the rotating detonation combustor 160 and travels along the combustion chamber. As the detonation wave consumes the air and the fuel, combustion products traveling along the combustion chamber accelerate and are discharged from the rotating detonation combustor 160, with the combustion products being exhausted through a bypass duct exit 166 to provide additional thrust at an exit nozzle 168 of the turboshaft engine 100.

Figure 1C:
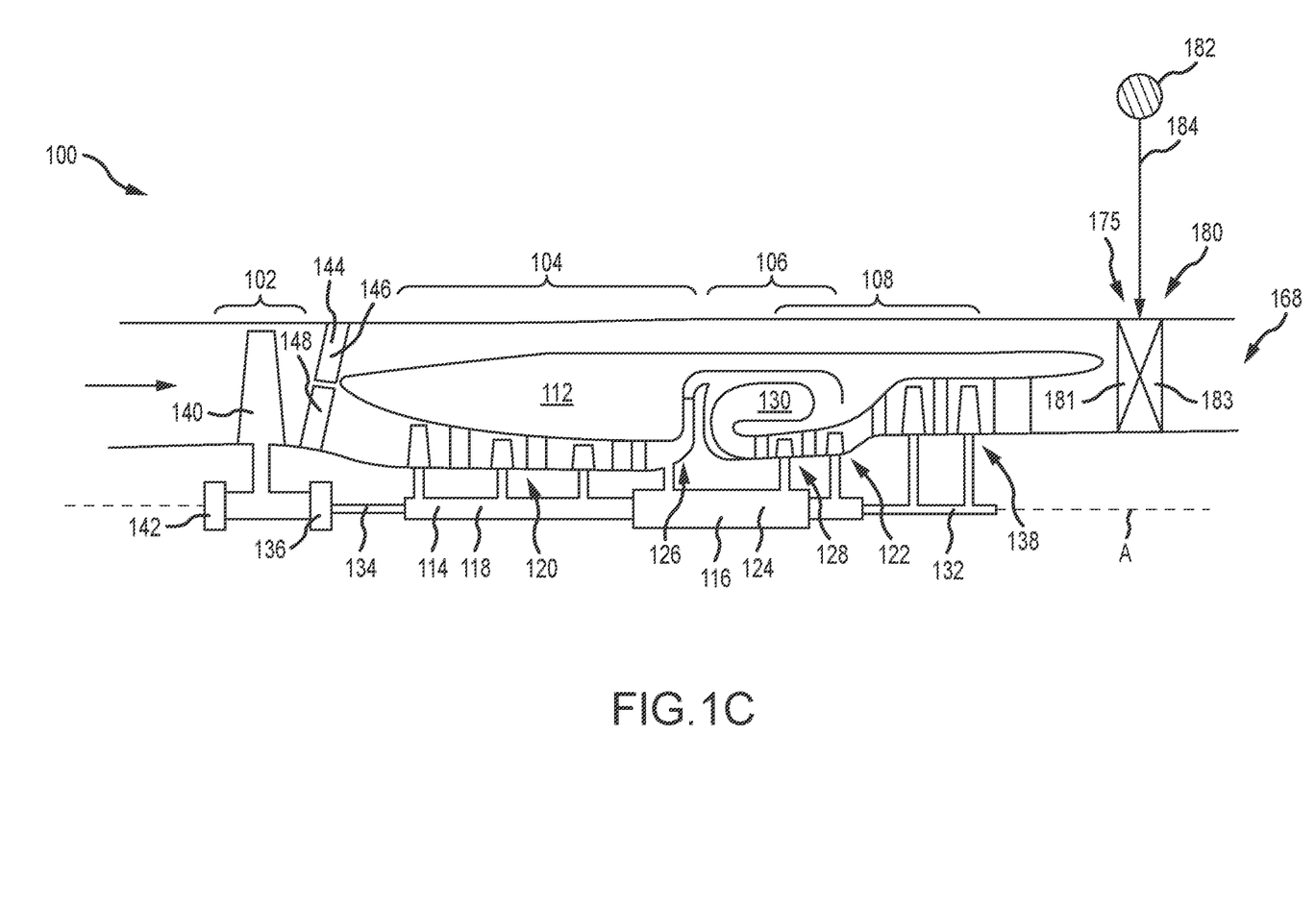

Referring now to FIG. 1C, the turboshaft engine 100 includes a supplemental combustor 175, which, in various embodiments, may take the form of a rotating detonation combustor 180 positioned within the exit nozzle 168. As will be described further below (with reference to FIGS. 3A and 3B), in various embodiments, the rotating detonation combustor 180 includes a fuel-air mixer 181 and an annular structure 183 disposed downstream of the fuel-air mixer 181. In various embodiments, compressed air within the bypass duct 110 and exhaust products from the core engine components are delivered to the rotating detonation combustor 180 and fuel from a fuel source 182 is delivered to the rotating detonation combustor 180 via a fuel duct 184. The combustion process begins in the rotating detonation combustor 180 when the fuel-air mixture is ignited via a spark or another suitable ignition source to generate a compression wave. The compression wave is followed by a chemical reaction that transitions the compression wave to a detonation wave. The detonation wave enters a combustion chamber of the rotating detonation combustor 180 and travels along the combustion chamber. As the detonation wave consumes the air and the fuel, combustion products traveling along the combustion chamber accelerate and are discharged from the rotating detonation combustor 180, with the combustion products being exhausted through the exit nozzle 168 to provide additional thrust at an exit nozzle 168 of the turboshaft engine 100.

Figure 2A:
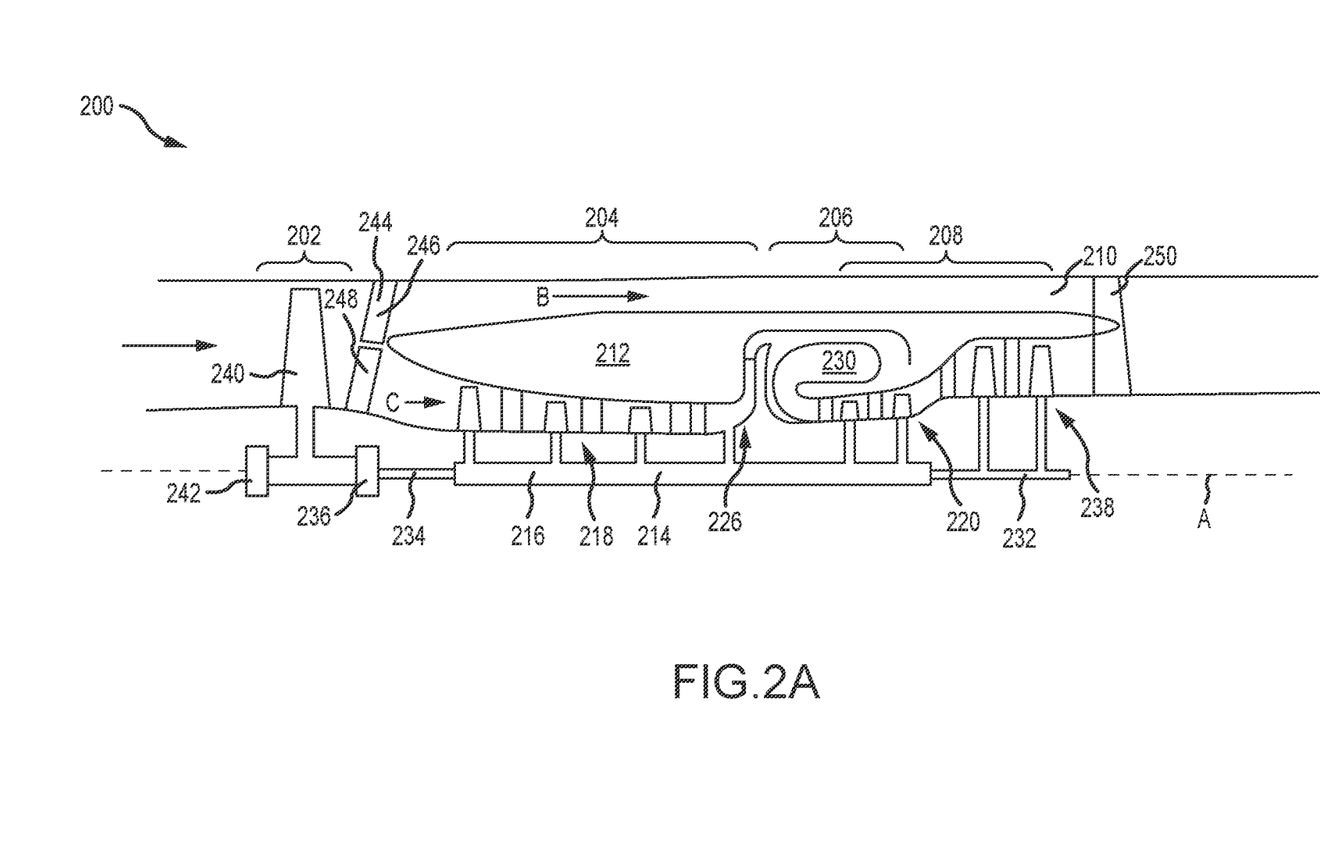
FIGS. 2A, 2B and 2C provide cross-sectional schematic views of a turboshaft engine, in accordance with various embodiments.

Referring now to FIG. 2A, a cross-sectional schematic view of a turboshaft engine 200 is provided, in accordance with various embodiments. The turboshaft engine 200 is disclosed herein as a two-spool turboshaft engine that generally incorporates a fan section 202, a compressor section 204, a combustor section 206 and a turbine section 208. The compressor section 204 (and to some extent the fan section 202) drives air along a core flow path C for compression and communication into the combustor section 206 and then expansion through the turbine section 208. The fan section 202 is configured to drive a bypass flow B (typically air) through a bypass duct 210. In general, the bypass duct 210 is defined by an annular space disposed radially outside a bypass splitter 212, which also encloses and provides a housing for the core engine components (e.g., the compressor section 204, the combustor section 206 and the turbine section 208) of the turboshaft engine 200.

The turboshaft engine 200 is depicted as a two-spool configuration, which includes a main spool 214 mounted for rotation about an engine central longitudinal axis A. The main spool 214 generally includes a main shaft 216 that interconnects a compressor 218 (depicted as a rotary and a centrifugal compressor) to a primary turbine 220. A combustor 230 is arranged between the compressor 218 and the primary turbine 220. The air in the core flow path C is compressed by the compressor 218, mixed and burned with fuel in the combustor 222, and then expanded over the primary turbine 220. The primary turbine 220 rotationally drives the main spool 214 and the compressor 218 in response to the expansion.

Still referring to FIG. 2, the turboshaft engine 200 further includes a second spool, referred to herein as a power spool 232, in addition to the main spool 214. The power spool 232 generally includes a power shaft 234 that interconnects a fan gearbox 236 to a power turbine 238. The power shaft 234 is also configured to rotate about the engine central longitudinal axis A and includes a longitudinal axis that is collinear with a longitudinal axis of the main shaft 216. The power spool 232 is driven by hot combustion gases expanding over the power turbine 238 after the gases exit the primary turbine 220. The power turbine 238 rotationally drives the fan gearbox 236 in response to the expansion. The fan gearbox 236 operably connects a fan gear system (e.g., an epicyclic gear system) to a fan 240 within the fan section 202. The fan gearbox 236, in various embodiments, is configured to drive the fan 240 at a different rotational speed than that of the power spool 232 during operation. In various embodiments, the power shaft 234 also interconnects a rotor gearbox 242 to the power turbine 238. The rotor gearbox 242 operably connects a rotor gear system to a rotor (e.g., a main rotor or a tail rotor of a helicopter). The rotor gearbox 242, in various embodiments, is configured to drive the rotor at a different rotational speed than that of the power spool 232 during operation.

During operation, the core engine components drive the power spool 232, as described above, and, in turn, drive the fan 240. As the fan 240 rotates, the bypass flow B (typically air) is driven through the bypass duct 210, providing a thrust component for the rotorcraft application. The thrust component, for example, may be a forward thrust component for a helicopter application, where the engines are typically in a fixed position with respect to the fuselage. In various embodiments, the turboshaft engine 200 includes a variable strut 244 (e.g., a fan exit variable vane) to manage or regulate one or both of the bypass flow B and the core flow C. In various embodiments, for example, the variable strut 244 may comprise separately operated struts, including a bypass flow variable strut 246 and a core flow variable strut 248. Although variable struts are one exemplary embodiment used herein, other forms of flow control devices may be leveraged. An aft engine strut 250 may also be included to manage or regulate the exit or exhaust flows of, respectively, the bypass flow B and the core flow C, and to assist mixing the two flows as they exit the turboshaft engine 200. In addition to driving the fan 240, the power turbine 238, as also described above, drives a rotor or similar device typically used with a rotorcraft application. Accordingly, a benefit of the turboshaft engine 200 is to provide conventional lift and thrust typically associated with, for example, the rotor of a helicopter, while at the same time providing a thrust component typically associated with a high or low bypass gas turbine engine.

Figure 2B:
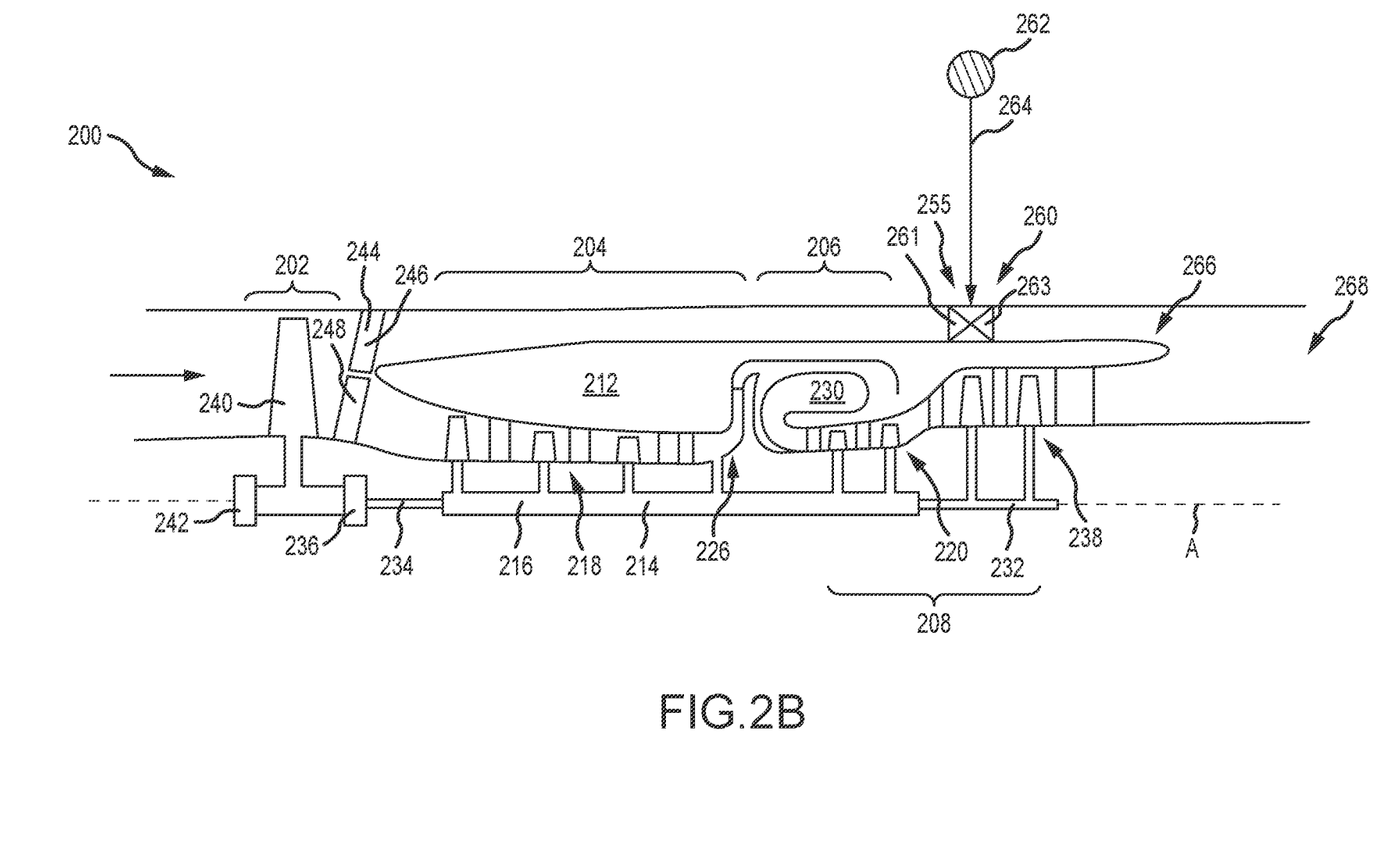

Referring now to FIG. 2B, the turboshaft engine 200 includes a supplemental combustor 255, which, in various embodiments, may take the form of a rotating detonation combustor 260 positioned within the bypass duct 210. As will be described further below (with reference to FIGS. 3A and 3B), in various embodiments, the rotating detonation combustor 260 includes a fuel-air mixer 261 and an annular structure 263 disposed downstream of the fuel-air mixer 261. In various embodiments, compressed air within the bypass duct 210 is delivered to the rotating detonation combustor 260 and fuel from a fuel source 262 is delivered to the rotating detonation combustor 260 via a fuel duct 264. The combustion process begins in the rotating detonation combustor 260 when the fuel-air mixture is ignited via a spark or another suitable ignition source to generate a compression wave. The compression wave is followed by a chemical reaction that transitions the compression wave to a detonation wave. The detonation wave enters a combustion chamber of the rotating detonation combustor 260 and travels along the combustion chamber. As the detonation wave consumes the air and the fuel, combustion products traveling along the combustion chamber accelerate and are discharged from the rotating detonation combustor 260, with the combustion products being exhausted through a bypass duct exit 266 to provide additional thrust at an exit nozzle 268 of the turboshaft engine 200.

Figure 2C:
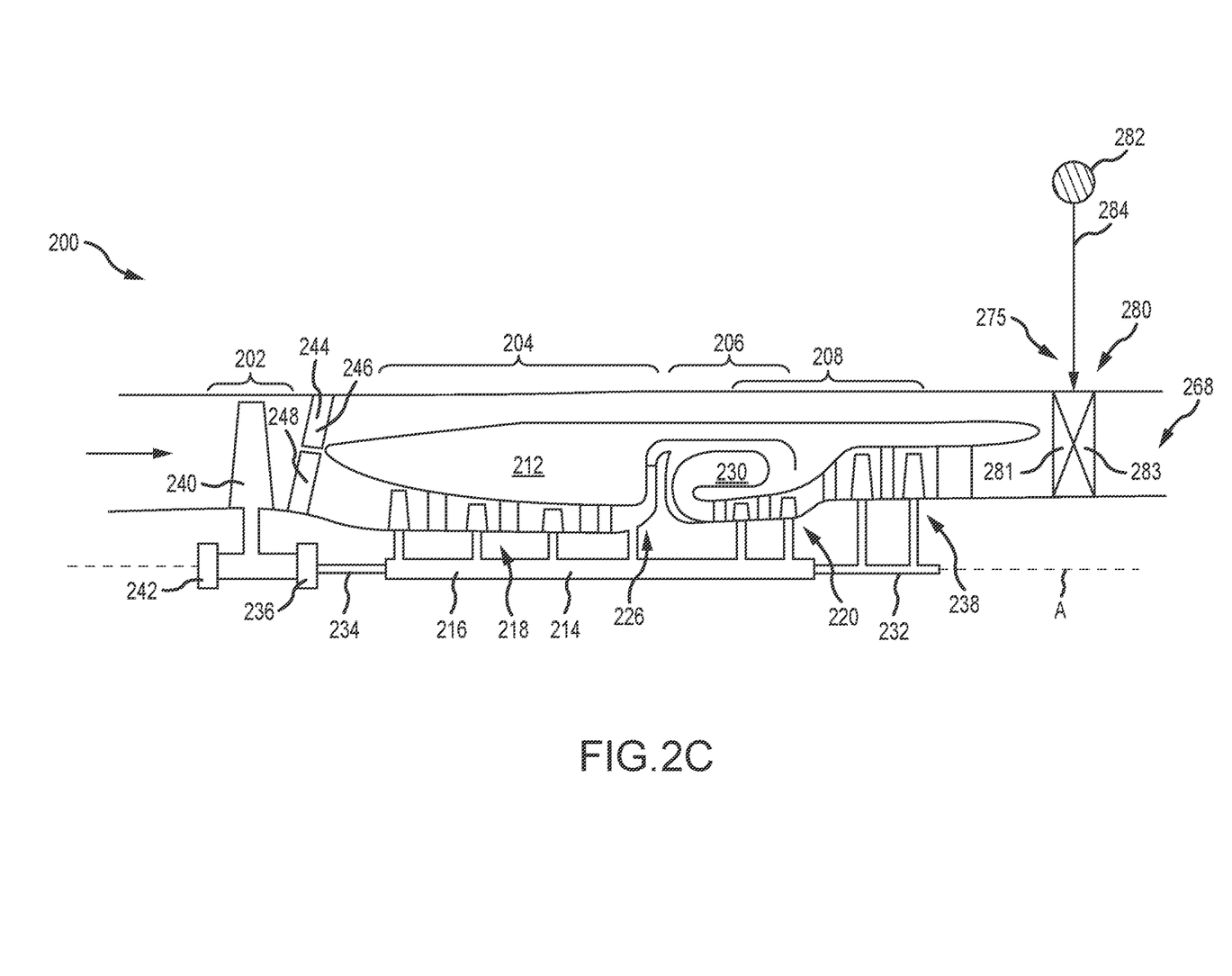

Referring now to FIG. 2C, the turboshaft engine 200 includes a supplemental combustor 275, which, in various embodiments, may take the form of a rotating detonation combustor 280 positioned within the exit nozzle 268. As will be described further below (with reference to FIGS. 3A and 3B), in various embodiments, the rotating detonation combustor 280 includes a fuel-air mixer 281 and an annular structure 283 disposed downstream of the fuel-air mixer 281. In various embodiments, compressed air within the bypass duct 210 and exhaust products from the core engine components are delivered to the rotating detonation combustor 280 and fuel from a fuel source 282 is delivered to the rotating detonation combustor 280 via a fuel duct 284. In various embodiments, the annular structure 283 may be an alternative suitable geometry (e.g., conical). In various embodiments, the fuel source 282 may be the same fuel system as that for the combustor 130. The combustion process begins in the rotating detonation combustor 280 when the fuel-air mixture is ignited via a spark or another suitable ignition source to generate a compression wave. The compression wave is followed by a chemical reaction that transitions the compression wave to a detonation wave. The detonation wave enters a combustion chamber of the rotating detonation combustor 280 and travels along the combustion chamber. As the detonation wave consumes the air and the fuel, combustion products traveling along the combustion chamber accelerate and are discharged from the rotating detonation combustor 280, with the combustion products being exhausted through the exit nozzle 268 to provide additional thrust at an exit nozzle 268 of the turboshaft engine 200. Further, it is noted that while the disclosure describes the rotating detonation combustor 260 and the rotating combustor 280 as receiving fuel from the fuel source 262 and the fuel source 282, respectively, the fuel sources, in various embodiments, are the same fuel sources used to supply fuel to the combustor 230, though the fuel supplied to the combustor 230 and the rotating detonation combustors may be metered independently (e.g., by separate fuel pumps) to stage the combustion processes in each combustor independently and to manage the thermal energy directed into the exit nozzle 268 downstream of the rotating detonation combustors; the same applies to the fuel source 162 and the fuel source 182 described above with reference to FIG. 1B and FIG. 1C, respectively Referring now to FIGS. 3A and 3B, a rotating detonation combustor 300, similar to the rotating detonation combustor 160 or the rotating detonation combustor 180, described above with reference to FIGS. 1B and 1C, respectively, or the rotating detonation combustor 260 or the rotating detonation combustor 280, described above with reference to and FIGS. 2B and 2C, respectively, is illustrated. The rotating detonation combustor 300 may include an annular structure 302 including an outer cylinder 304 and an inner cylinder 306. The outer cylinder 304 and the inner cylinder 306 define a volume 308 therebetween. Although the rotating detonation combustor 300 is shown as an annular structure, the rotating detonation combustor 300 may have any shape that provides a continuous path for detonation to occur. For example, the rotating detonation combustor 300 may have an elliptical shape, a trapezoidal shape, or the like. In this regard, where used in this context, the term "annulus" or "annular structure" may refer to any continuous circumferential channel having an annular or any other shape such as trapezoidal or elliptical. Furthermore, where used herein, the term "annular volume" may likewise refer to any continuous circumferential channel having annular or any other shape such as trapezoidal or elliptical.

Figure 3A:
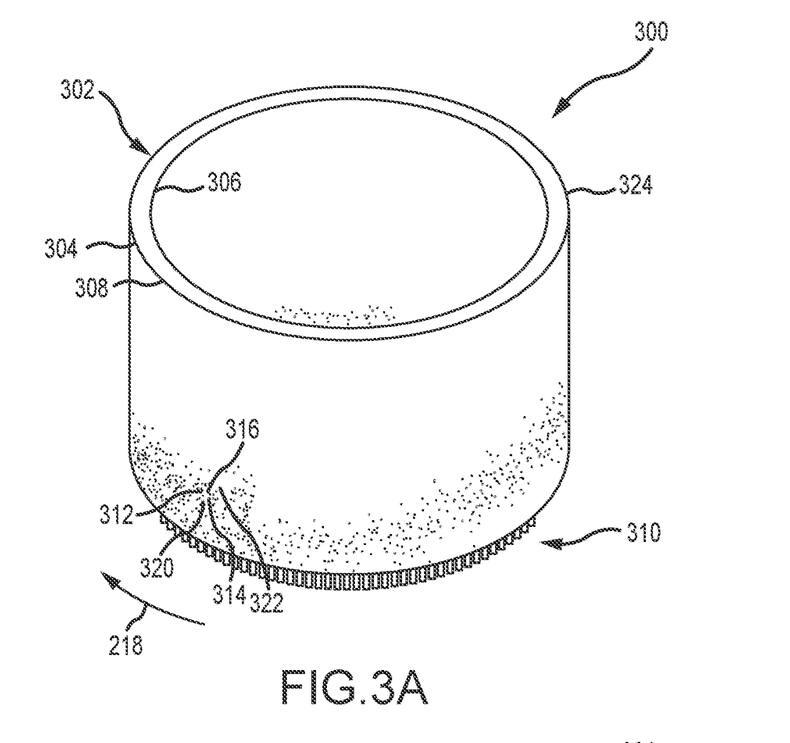
FIGS. 3A and 3B provide schematic views of a rotating detonation combustor, in accordance with various embodiments.
Figure 3B:
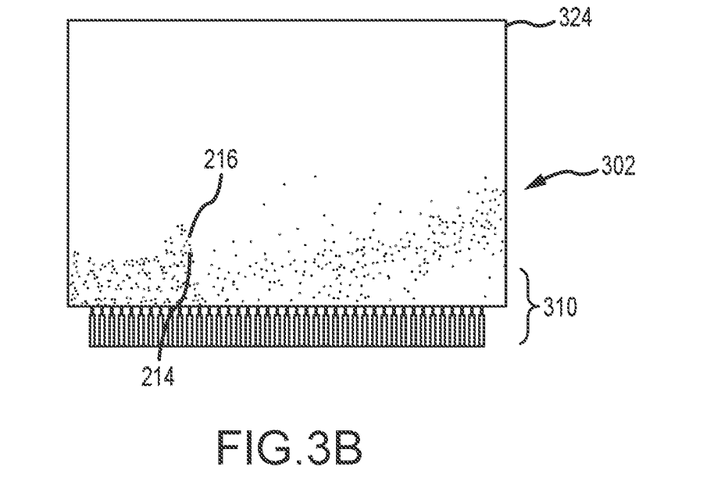

In various embodiments, a fuel-air mixer 310 is positioned upstream from the annular structure 302 and is configured to provide a fuel mixture 312 including a combustible blend of air (or oxidizer) and fuel. The combustible blend may comprise, for example, (i) the air passing through the bypass duct 110 and the fuel from the fuel source 162 described above with reference to FIG. 1B, (ii) the air passing through the bypass duct 110, the exhaust products from the core engine components and the fuel from the fuel source 182 described above with reference to FIG. 1C, (iii) the air passing through the bypass duct 210 and the fuel from the fuel source 262 described above with reference to FIG. 2B, or (iv) the air passing through the bypass duct 210, the exhaust products from the core engine components and the fuel from the fuel source 282 described above with reference to FIG. 2C. The fuel mixture 312 may be continuously introduced into the volume 308. The rotating detonation combustor 300 is then initialized (e.g., ignited), causing a detonation wave 314 to occur. The detonation wave 314 corresponds to an ignition or combustion of the fuel mixture 312 at a particular location about a circumference of the annular structure 302. The detonation wave 314 may then continuously travel around the circumference of the annular structure 302. As shown in FIG. 3A, the detonation wave 314 may occur at a location 316 and may travel in a direction illustrated by an arrow 318. A first location 320 within the volume 308 and preceding the detonation wave 314 may include a relatively large density of the fuel mixture 312. As the detonation wave 314 reaches the first location 320, the density of the fuel mixture 312 allows the fuel mixture 312 to detonate. After detonation occurs, the fuel mixture 312 is burned away and the force of the detonation wave 314 temporarily resists entry of additional amounts of the fuel mixture 312 into the volume 308. Accordingly, a second location 322 that has recently detonated may have a relatively low density of the fuel mixture 312. As a result, the detonation wave 314 continues to rotate about the volume 308 in the direction shown by the arrow 318. The detonation wave 314 generates detonation exhaust. The rotating detonation combustor 300 includes a downstream outlet 324 through which the detonation exhaust travels prior to reaching the exit nozzle 168 (see FIGS. 1B and 1C) or the exit nozzle 268 (see FIGS. 2B and 2C).

The herein disclosure improves upon conventional turboshaft engines, which typically do not leverage a supplemental combustor and operate as single combustor systems. This disclosure introduces a simple supplemental combustor concept that can be leveraged to provide enhanced engine thrust for an air vehicle to assist with mode transition and rapid egress as well as increase forward speed and acceleration during horizontal flight. In various embodiments, the supplemental combustor takes the form of a rotating detonation combustor positioned within a bypass duct or an exit nozzle downstream of a bypass duct. While the disclosure focuses on the supplemental combustor being in the form of a rotating detonation combustor, the disclosure contemplates other such supplemental combustors. Thus, the term supplemental combustor should be considered broadly and not limited to the rotating detonation combustors described herein. Further, while the disclosure focuses primarily on rotorcraft applications, the disclosure contemplates other applications, such as, for example, motor-generator applications or electric power generation equipment. In addition, while the disclosure focuses on the supplemental combustor being positioned within or downstream of a bypass duct, the disclosure contemplates embodiments where the supplemental combustor is positioned upstream of and configured to at least partially provide power or supplemental power to a power turbine configured to provide power to fan or to a rotor or to electric power generation equipment.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Finally, any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A gas turbine engine, comprising:
 a core engine, including a compressor section, a primary combustor and a turbine section positioned within a core flow path of the gas turbine engine;
 a bypass splitter positioned radially outward of the core engine and configured to house the compressor section, the primary combustor and the turbine section;
 a bypass duct positioned radially outward of the bypass splitter;
 a power spool operably coupled to the core engine;
 a fan section, wherein the power spool is operably connected to a fan within the fan section and configured to rotationally drive the fan;
 a high-speed spool, wherein the compressor section includes a high-pressure compressor and the turbine section includes a high-pressure turbine, the high-pressure compressor and the high-pressure turbine being interconnected via the high-speed spool;
 a low-speed spool, wherein the compressor section includes a low-pressure compressor and the turbine section includes a low-pressure turbine, the low-pressure compressor and the low-pressure turbine being interconnected via the low-speed spool,
 wherein the power spool includes a power turbine positioned downstream of the low-pressure turbine, and
 wherein the power spool includes a power shaft configured to interconnect a fan gearbox to the power turbine, the fan gearbox operably connected to the fan;
 a supplemental combustor, wherein the supplemental combustor is a rotating detonation combustor, wherein the rotating detonation combustor is positioned within the bypass duct, wherein the rotating detonation combustor includes a fuel-air mixer configured to receive a compressed air and a fuel, wherein the compressed air is received directly via the bypass duct driven by the fan, and wherein the fuel is received from a fuel source via a fuel duct;
 a bypass flow variable strut configured to manage or regulate a bypass flow through the bypass duct; and
 a core flow variable strut configured to at least one of manage or regulate a core flow into a combustion section, wherein both the bypass flow variable strut and the core flow variable strut are positioned aft of the fan and forward of the bypass splitter.

2. The gas turbine engine of claim 1, wherein the rotating detonation combustor includes an annular structure positioned downstream of the fuel-air mixer and configured to combust the compressed air and the fuel.

* * * * *